(12) United States Patent
Bryce et al.

(10) Patent No.: US 8,033,703 B2
(45) Date of Patent: Oct. 11, 2011

(54) RATCHETING FASTENER FOR LAMP ATTACHMENT

(75) Inventors: Rodney R. Bryce, Orion, MI (US); Gregory G. Gordon, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 169 days.

(21) Appl. No.: 12/234,872

(22) Filed: Sep. 22, 2008

(65) Prior Publication Data

US 2010/0073952 A1  Mar. 25, 2010

(51) Int. Cl.
*F21V 7/04* (2006.01)
(52) U.S. Cl. .......................... 362/549; 411/338
(58) Field of Classification Search .................. 362/549, 362/191, 430; 411/338; 403/292, 296
See application file for complete search history.

(56) References Cited

U.S. PATENT DOCUMENTS

| | | | | |
|---|---|---|---|---|
| 3,897,713 | A | * | 8/1975 | Gugle ............................ 411/389 |
| 3,966,339 | A | * | 6/1976 | Nemecek et al. ............. 403/292 |
| 4,157,674 | A | * | 6/1979 | Carlson et al. ................ 411/389 |
| 4,186,645 | A | * | 2/1980 | Zaydel ............................ 411/55 |
| 4,223,585 | A | * | 9/1980 | Barth et al. ................... 411/389 |
| 4,742,663 | A | * | 5/1988 | Demers .......................... 52/848 |
| 5,333,978 | A | * | 8/1994 | Rives ............................ 411/389 |
| 2002/0136595 | A1 | * | 9/2002 | Schubring et al. ............ 403/296 |

FOREIGN PATENT DOCUMENTS

| | | |
|---|---|---|
| DE | 41 35 020 A1 | 6/1992 |
| DE | 199 26 842 A1 | 12/2000 |
| DE | 101 21 114 A1 | 10/2002 |
| DE | 102004053742 A1 | 6/2006 |
| EP | 0 596 428 A1 | 5/1994 |

* cited by examiner

*Primary Examiner* — Evan Dzierzynski
(74) *Attorney, Agent, or Firm* — Quinn Law Group, PLLC

(57) ABSTRACT

A fastener for a vehicle includes a fastener head. A lamp stalk extends in a first direction from the fastener head, and a vehicle stalk extending in a second direction from the fastener head. The lamp stalk includes a plurality of protruding rings and the vehicle stalk includes a threaded engagement portion.

14 Claims, 2 Drawing Sheets

RATCHETING FASTENER FOR LAMP ATTACHMENT

TECHNICAL FIELD

The present invention relates generally to a lamp assembly for vehicles, and more specifically to an arrangement for attachment of a lamp assembly.

BACKGROUND OF THE INVENTION

Automotive vehicles are commonly equipped with lamp assemblies that are used for providing illumination for the vehicle operator, signaling for other vehicle operators and various other functions. The lamp assemblies are pre-assembled into a lamp housing prior to assembly into the vehicle. The lamp assemblies may include other components and circuitry required for lamp operation. Additionally, lamp assemblies may include multiple lamps, or lamps used for multiple features.

The lamp housing is designed to meet packaging requirements specific to the vehicle with which it is used. The lamp housing is intended to be easily mounted in a vehicle during the assembly process. The lamp housing is typically attached to the vehicle at multiple locations to provide support. However, manufacturing variances of the components which the lamp housing attaches to must be accounted for.

SUMMARY OF THE INVENTION

A fastener for attaching a lamp housing in a vehicle that can provide an adjustable fit between the fastener and the vehicle is desired.

A vehicle includes a vehicle body that has a fastener receiver located therein. The receiver defines at least one vehicle ring located within the receiver and protruding inwardly.

A fastener for the lamp assembly includes a fastener head. A lamp stalk extends in a first direction from the fastener head, and a vehicle stalk extends in a second direction from the fastener head. The lamp stalk includes a plurality of protruding rings and the vehicle stalk includes a threaded engagement portion. The threaded engagement portion is engaged with the at least one vehicle ring when the vehicle stalk is assembled in the receiver.

The above features and advantages, and other features and advantages of the present invention will be readily apparent from the following detailed description of the preferred embodiments and best modes for carrying out the present invention when taken in connection with the accompanying drawings.

DESCRIPTION OF THE PREFERRED EMBODIMENTS

Figure 1:
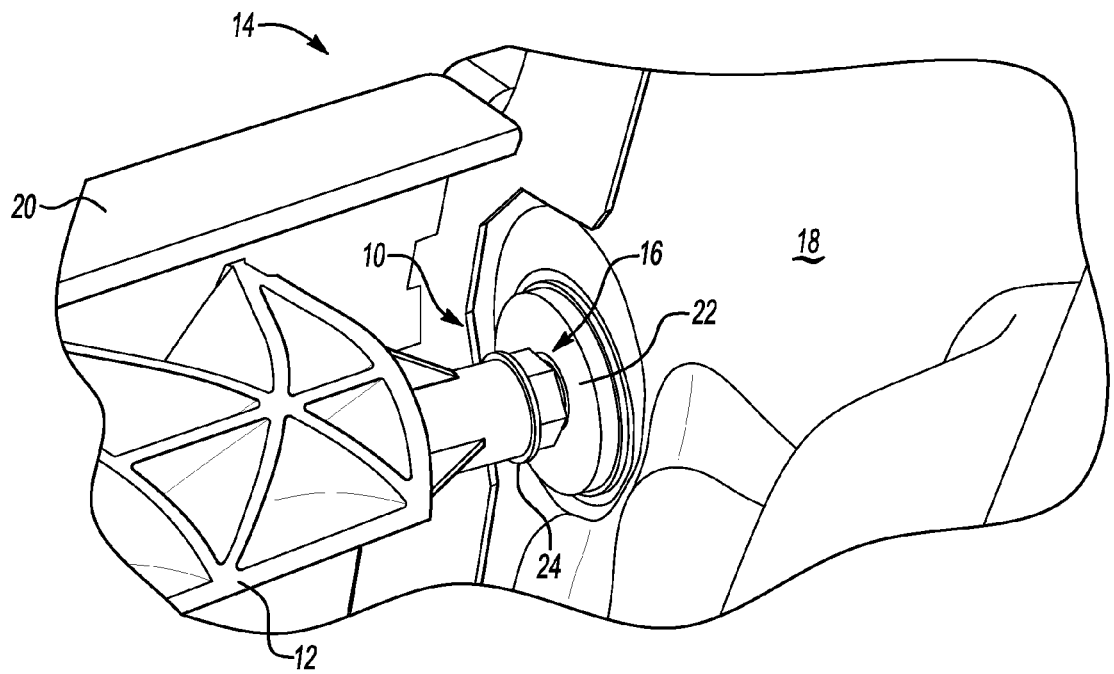
FIG. 1 is a schematic partial perspective view of a fastener that retains a lamp assembly within an automotive vehicle.

Referring to the Figures, wherein like reference numbers refer to the same or similar components throughout the several views, FIG. 1 is a perspective view of a fastener 10 retaining a lamp assembly 12 within an automotive vehicle 14. The fastener 10 is assembled with the lamp assembly 12. The lamp assembly 12 is then assembled into the vehicle 14. Multiple fasteners 10 may be used with each lamp assembly 12.

A vehicle receiver 16 (i.e. a cavity defined by the vehicle body 18) for assembling the fastener 10 to the vehicle body 18 is located on the vehicle body 18 near the front 20 of the vehicle. A surface 22 on the vehicle 14 is formed to provide a stopping point for the fastener 10 when it is assembled into the vehicle 14. Additionally, the fastener 10 includes a lamp surface 24 forming a positive stop for assembling the lamp assembly 12 on the fastener 10. Multiple vehicle receivers 16 may be formed at multiple locations on the vehicle body 18 for receiving the multiple fasteners 10. In addition, multiple lamp assemblies 12 may be located at other locations on the automotive vehicle 14. Fasteners 10 may be used to secure all the lamp assemblies 12 associated with a vehicle 14.

Figure 2:
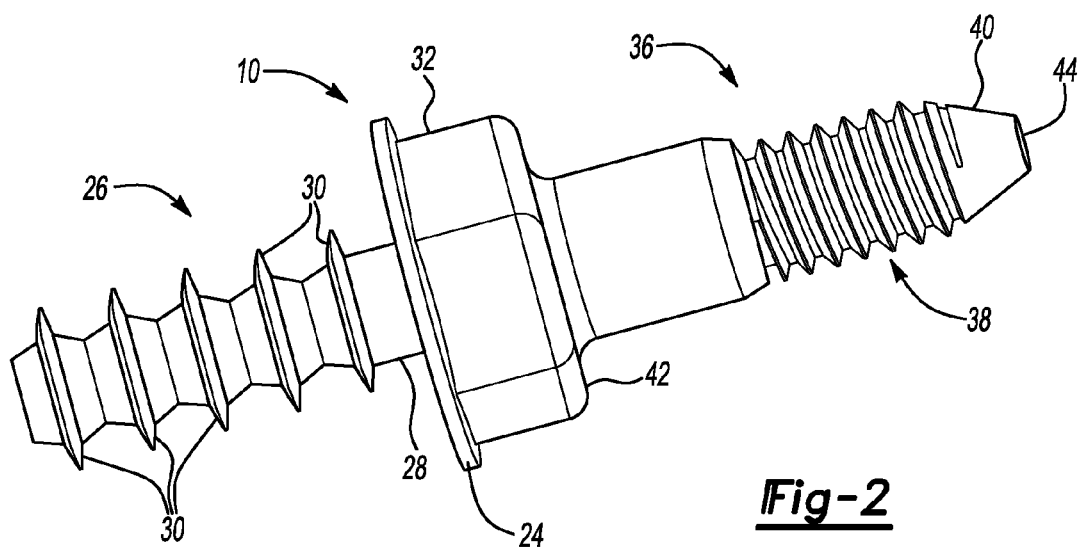
FIG. 2 is a schematic perspective view of the fastener of FIG. 1.

FIG. 2 illustrates a perspective view of the fastener 10. The fastener 10 includes a lamp portion 26 for retaining the fastener 10 to the lamp assembly 12 (shown in FIG. 1). The lamp portion 26 has a lamp stalk 28 with protruding rings 30. The protruding rings 30 are preferably concentric about the stalk 28 and are evenly spaced from one another. The lamp stalk 28 extends from a head 32 of the fastener 10 in a first direction.

Figure 3:
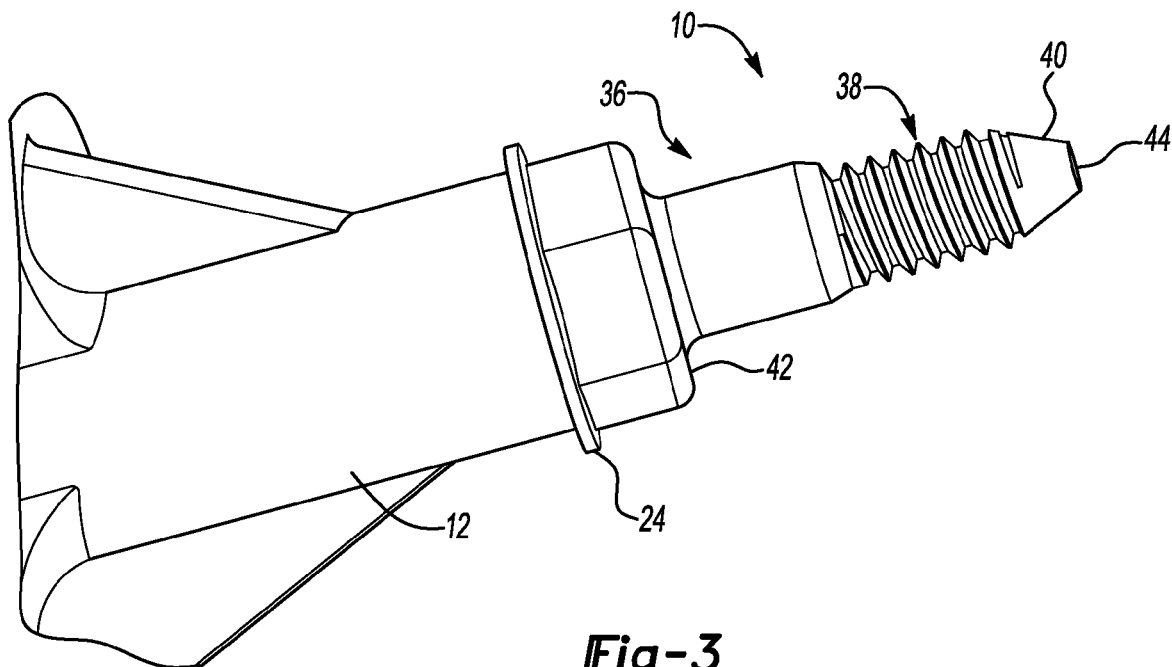
FIG. 3 is a schematic perspective view of the fastener of FIGS. 1 and 2 assembled on the lamp assembly.

FIG. 3 shows the lamp stalk 28 assembled within the lamp assembly 12. The head 32 includes the lamp surface 24 which forms a positive stop for the attachment of the lamp assembly 12 to the lamp portion 26. The fastener 10 is pushed into an opening 33 (shown in FIG. 4) defined on an assembly surface 34 of the lamp assembly 12. Grooves 35 within the lamp assembly 12 correspond to the protruding rings 30 (shown in FIG. 2) on the fastener 10. The protruding rings are engaged within the grooves to retain the fastener 10 within the lamp assembly 12. The lamp portion 26 may be varied in length and width to correspond to the opening of the lamp assembly 12.

Referring back to FIG. 2, a vehicle stalk 36 extends from the head 32 in a second direction, opposing the first direction. A threaded engagement portion 38 is defined on the vehicle stalk 36. In addition, an alignment portion 40 and a shoulder 42 may also be located on the vehicle stalk 36. The shoulder 42 provides a surface to form a positive stop when meshing with the surface 22 of the vehicle receiver 16. The alignment portion 40 assists in assembling the fastener 10 in the vehicle 14. The alignment portion 40 is tapered such that the diameter of the vehicle stalk 36 decreases toward an end 44 to assist in aligning the vehicle stalk 36 with the vehicle receiver 16 during assembly of the lamp assembly 12 in the vehicle 14.

Figure 4:
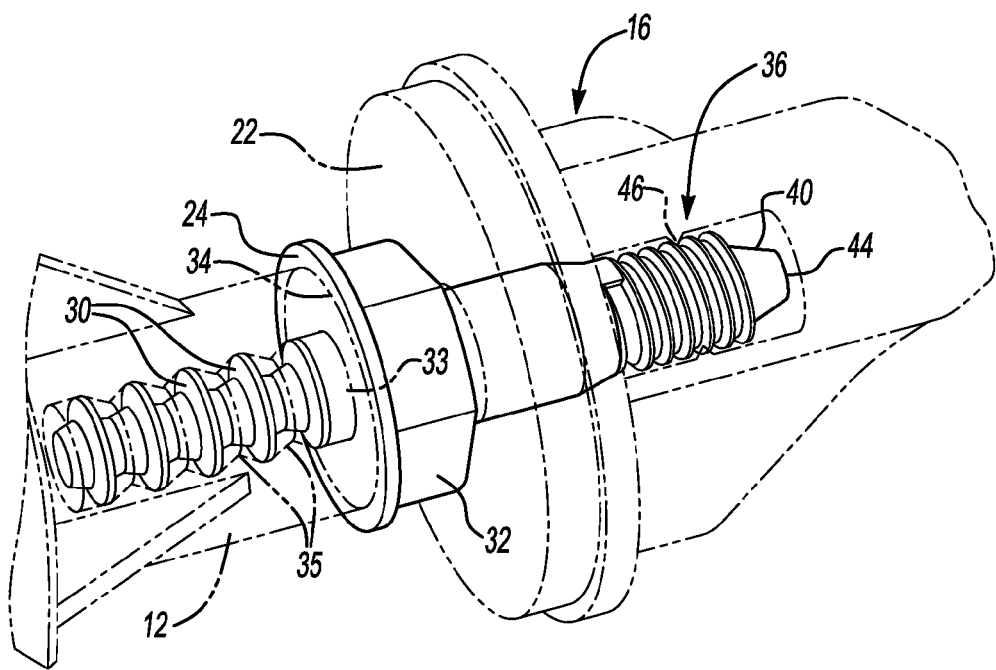
FIG. 4 is a schematic perspective view of the fastener of FIGS. 1-3 and a vehicle fastening portion shown in phantom.

FIG. 4 shows the vehicle stalk 36 assembled within the vehicle receiver 16. The threaded engagement portion 38 is engaged in the vehicle receiver 16 by at least one vehicle ring 46. The threaded engagement portion 38 provides an adjustable fit between the shoulder 42 and the engagement portion 38 engaged by the at least one vehicle ring 46 to ensure engagement of the fastener 10 to the vehicle 14. The adjustable fit of the threaded engagement portion 38 with the vehicle ring 46 allows for variations in the distance between the surface 22 of the vehicle receiver 16 and vehicle ring 46, which may occur due to manufacturing variances in the body 18 of the vehicle 14 (shown in FIG. 1). That is, by threading more or less of the threads past the vehicle ring 46, the variation in distance between the surface 22 and the ring 46 is accommodated. The amount of adjustable fit between the fastener 10 and the vehicle 14 would be dependant on the length of the engagement portion 38. One skilled in the art would know a desirable length for the engagement portion 38 based upon the manufacturing tolerances of the particular vehicle 14.

The fastener 10 may be assembled into the vehicle 14 by pushing, or ratcheting, the fastener 10 into the vehicle receiver 16 until the shoulder 42 on the fastener head 32 is in contact with the surface 22 of the vehicle receiver 16. In addition to pushing or ratcheting, the fastener 10 may also be assembled by screwing the threaded portion 38 on the vehicle ring 46. The threaded portion 38 ensures that vehicle ring 46 engages the fastener 10 to retain the fastener 10 and lamp assembly 12 to the vehicle 14. For ease of assembly each of the fasteners 10 associated with a lamp assembly 12 may be assembled on the lamp assembly 12 prior to assembly within the vehicle 14.

In addition to providing an adjustable fit, the threaded engagement portion 38 allows the fastener 10 to be removed from the vehicle 10 by rotating the fastener relative to the vehicle receiver 16 to unscrew the threaded engagement portion 38 from the vehicle ring 46. The fastener 10 could be formed of metal or plastic as is desirable for the particular vehicle 14 which fastener 10 is to be used with. The threaded engagement portion 38 may be a standard thread size, or may be varied as required for the secured engagement of the threads with the vehicle ring 46.

While the best modes for carrying out the invention have been described in detail, those familiar with the art to which this invention relates will recognize various alternative designs and embodiments for practicing the invention within the scope of the appended claims.

The invention claimed is:

1. A fastener system for a lamp assembly in a vehicle, the system comprising:
   a fastener head;
   a lamp stalk extending in a first direction from the fastener head, wherein the lamp stalk includes a plurality of protruding rings;
   a vehicle stalk extending in a second direction from the fastener head, wherein the vehicle stalk includes a threaded engagement portion; and
   wherein the vehicle has a vehicle body defining a vehicle receiving cavity and at least one vehicle ring; and wherein the threaded engagement portion is engaged by the at least one vehicle ring located within the vehicle receiving cavity; and
   wherein the lamp assembly defines a plurality of annular grooves, wherein the plurality of protruding rings on the lamp stalk engage the annular grooves of the lamp assembly to secure the lamp stalk within the lamp assembly, and wherein the fastener head is configured to facilitate the threaded engagement portion being selectively screwed into and unscrewed from the at least one vehicle ring.

2. The fastener system of claim 1, further comprising a vehicle alignment portion located on the vehicle stalk, wherein the vehicle alignment portion is tapered toward an end of the vehicle stalk.

3. The fastener system of claim 1, wherein the fastener head defines a first surface, the lamp stalk extending perpendicular to the first surface; and wherein the fastener head defines a second surface, substantially parallel to the first surface and the vehicle stalk extends from the second surface in the second direction, opposing the first direction.

4. The fastener of claim 3, wherein the first surface is touching the lamp assembly to provide a positive stop when the fastener is assembled within the lamp assembly and wherein the second surface is touching the vehicle body to provide a positive stop when the fastener is assembled within the vehicle.

5. The fastener system of claim 1, wherein the lamp stalk is receivable in a lamp assembly and the plurality of protruding rings engage the lamp assembly to secure the lamp stalk within the lamp assembly.

6. A vehicle comprising:
   a vehicle body defining a vehicle receiving cavity and at least one inwardly protruding vehicle ring within the vehicle receiving cavity;
   a lamp assembly;
   a fastener defining a fastener head;
   a lamp stalk extending in a first direction from the fastener head, wherein the lamp stalk includes a plurality of protruding rings; and
   a vehicle stalk extending in a second direction from the fastener head, wherein the vehicle stalk includes a threaded engagement portion to engage the at least one vehicle ring;
   wherein the lamp assembly defines a plurality of annular grooves, and wherein the plurality of protruding rings on the lamp stalk engage the annular grooves of the lamp assembly to secure the lamp stalk within the lamp assembly;
   wherein the fastener head defines a first surface which forms a positive stop for the lamp assembly when the lamp assembly is attached to the lamp stalk, the lamp stalk extending perpendicular to the first surface and wherein the fastener head defines a second surface, parallel to the first surface and the vehicle stalk extends from the second surface in the second direction, opposing the first direction; and
   wherein the fastener head is configured to facilitate the threaded engagement portion being selectively screwed into and unscrewed from the at least one vehicle ring.

7. The vehicle of claim 6, further comprising a vehicle alignment portion located on the vehicle stalk, wherein the vehicle alignment portion is tapered toward an end of the vehicle stalk.

8. The vehicle of claim 6, wherein the lamp stalk is receivable in the lamp assembly and the plurality of protruding rings engage the lamp assembly to secure the lamp stalk within the lamp assembly.

9. The vehicle of claim 6, wherein the first surface is touching a lamp assembly to provide a positive stop when the fastener is assembled within the lamp assembly and wherein the second surface is touching the vehicle body to provide a positive stop when the fastener is assembled within the vehicle.

10. A lamp assembly in a vehicle, the lamp assembly comprising:
    a lamp housing; and
    a fastener attached to the lamp housing, wherein the fastener defines a fastener head and a vehicle stalk extending from the fastener head, wherein the vehicle stalk includes a threaded engagement portion;
    wherein the vehicle has a vehicle body defining a vehicle receiving cavity and at least one vehicle ring; and wherein the threaded engagement portion is engaged by the at least one vehicle ring located within the vehicle receiving cavity;
    wherein the lamp stalk is receivable in the lamp assembly and the plurality of protruding rings engage the lamp assembly to secure the lamp stalk within the lamp assembly;

wherein the lamp assembly defines a plurality of annular grooves, and wherein the plurality of protruding rings on the lamp stalk engage the annular grooves of the lamp assembly to secure the lamp stalk within the lamp assembly; and wherein the fastener head is configured to facilitate the threaded engagement portion being selectively screwed into and unscrewed from the at least one vehicle ring.

11. The lamp assembly of claim 10, wherein the fastener further comprises a vehicle alignment portion located on vehicle stalk, wherein the vehicle alignment portion is tapered toward an end of the vehicle stalk.

12. The lamp assembly of claim 10, wherein the fastener head defines a first surface, and a lamp stalk extending perpendicular to the first surface and wherein the fastener head defines a second surface parallel to the first surface and the vehicle stalk extends from the second surface in a second direction, opposing the first direction.

13. The lamp assembly of claim 12, wherein the first surface is touching the lamp assembly to provide a positive stop when the fastener is assembled within the lamp assembly and wherein the second surface is touching the vehicle body to provide a positive stop when the fastener is assembled within the vehicle.

14. The lamp assembly of claim 10, wherein the lamp stalk is receivable in the lamp assembly and the plurality of protruding rings engage the lamp assembly to secure the lamp stalk within the lamp assembly.

* * * * *